June 24, 1969  E. J. NAGY  3,451,726
COMBINATION PNEUMATIC AND GRAVITY DISCHARGE GATE
Filed Jan. 26, 1968  Sheet 2 of 3
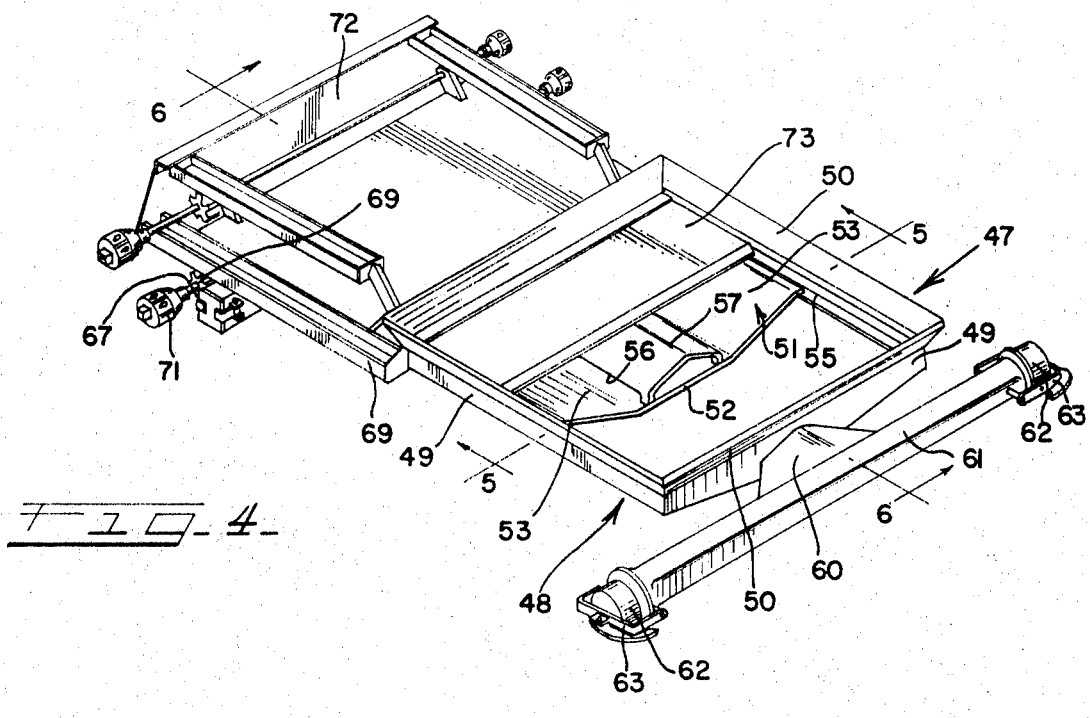
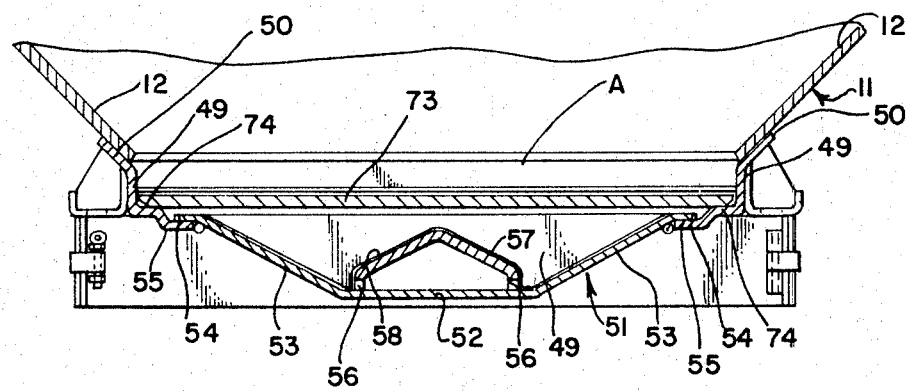
INVENTOR
ERNEST J. NAGY
BY Helmuth O. Vogel
ATT'Y.

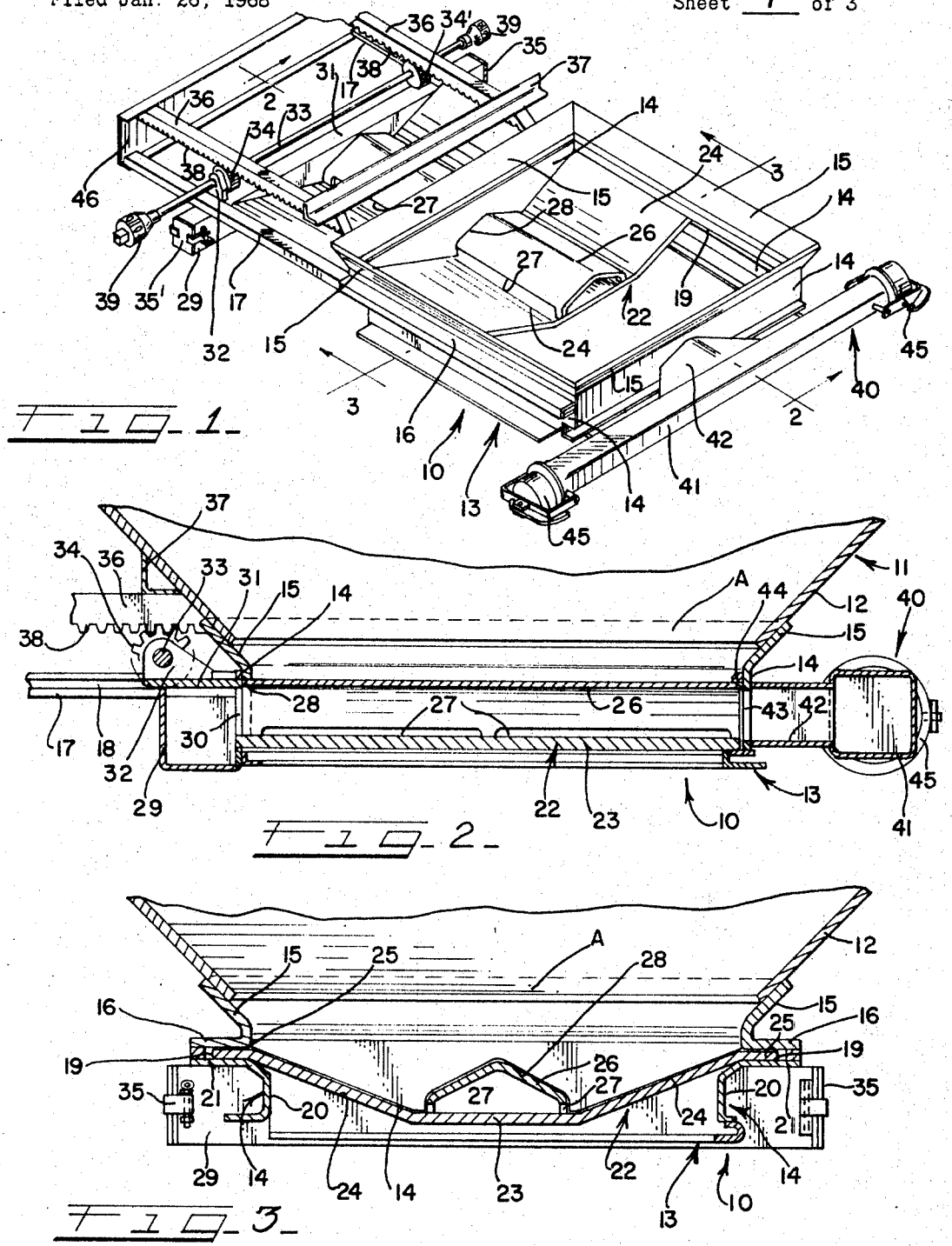

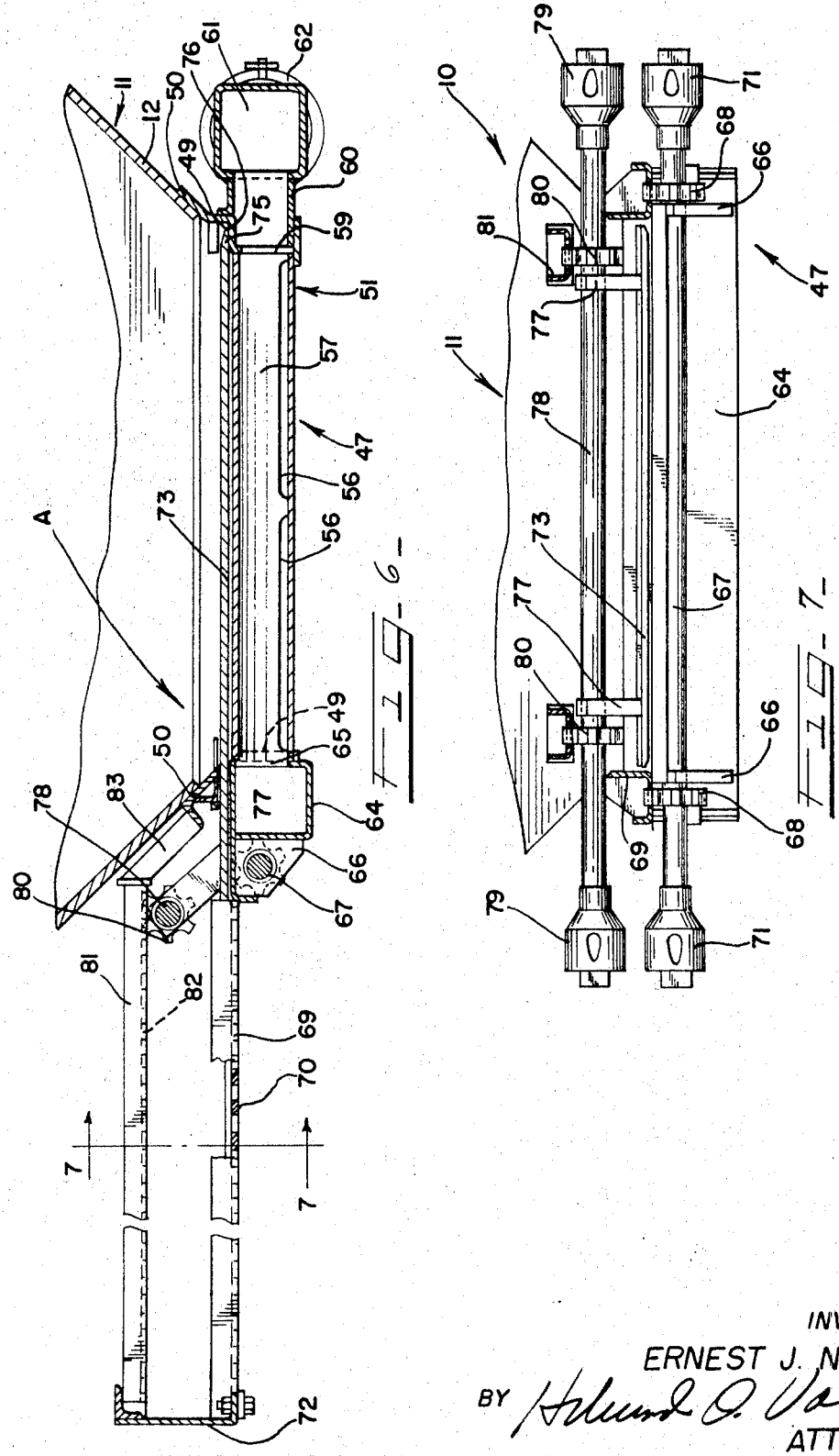

United States Patent Office 3,451,726
Patented June 24, 1969

3,451,726
COMBINATION PNEUMATIC AND GRAVITY DISCHARGE GATE
Ernest J. Nagy, Munster, Ind., assignor to Pullman Incorporated, Chicago, Ill., a corporation of Delaware
Filed Jan. 26, 1968, Ser. No. 700,838
Int. Cl. B65g 53/46
U.S. Cl. 302—52    5 Claims

ABSTRACT OF THE DISCLOSURE

A combination pneumatic and gravity discharge gate for hoppers which includes a four-walled framework connected to the discharge end of a hopper to provide a discharge chamber. A closure member is slidably supported on the frame to close the discharge chamber, the same including a pneumatic hood which in the closed position is connected to a material conveying duct for withdrawing material from the discharge chamber. The hood is withdrawn from the closed position with the closure member through a wall to a position to one side of the discharge chamber and the said closure member includes diverging wall portions which direct material to openings provided in the hood.

A modification includes a second closure member which is disposed above the hooded closure member and is movable from a position underneath the discharge chamber to open the same to provide for gravity discharge with the lower closure member in its non-operative position. The upper closure member is also movable to one side of the discharge chamber whereupon it is disposed in a non-use position over the hooded closure member.

BACKGROUND OF THE INVENTION

Field of the invention

The field of the invention has to do with discharge devices for material hoppers. The hoppers may be stationary, or may be supported on vehicles such as railway cars or trailers. Bulk materials are contained in the hoppers and are discharged either by gravity or pneumatic unloading means which include ducts for conveying the discharged material to receiving bins or other vehicles.

Description of the prior art

In the prior art, combination gravity and pneumatic gates have been provided which will permit discharge of material from a hopper either by gravity or by suction such as is afforded by pneumatic conveying means. In certain designs a gravity gate is provided which when moved to an open position relative to the discharge hopper, will permit the gravity discharge of material. In the event that pneumatic discharge is desired in devices of this type, a pan is disposed underneath the discharge opening below the gravity gate, the said pan being provided with a duct for discharging material from the hopper. The discharge pan containing the duct may be usually connected by securing means to the frame underneath the discharge hopper which, of course, requires the time consuming task of affixing and removing the pan depending upon which type of discharge operation is required. Other designs include pneumatic discharge hoods which are permanently affixed above the gravity gate which in the closed position permits the pneumatic discharge of material. However, such a fixed hood will tend to obstruct the flow of material through the discharge chamber when the gate has been opened for the gravity discharge of materials.

SUMMARY

The invention relates to a combination gravity and pneumatic discharge gate for effecting discharge of materials from a hopper. The gate comprises a closure member which is movable from an out-of-the-way position disposed to one side of the hopper discharge opening to a position underneath the discharge opening wherein the discharge opening is closed and materials are withdrawn pneumatically from the hopper by means of a hood which is supported on the gate, which in a closed position, is in communication with a pneumatic material conveying duct. The closure member includes a pair of diverging surfaces which direct material through openings provided in the discharge hood. A wall of the frame of the gate comprises an opening of substantially the same shape as the hood, the said wall also having surfaces engaging the closure member so that when it is withdrawn from the closed position residue material which may remain on top of the hood and on the closure member is swept off as the closure member and hood is moved laterally to one side of said hopper.

A modified embodiment includes a combination gate which in addition to the above structure also includes a second closure member which is disposed on the frame of the combination gate above the hooded closure. The second closure member is also adapted to be moved into position underneath the discharge chamber of the gate for blocking discharge of material and is moved laterally to one side of the discharge chamber above the hooded closure member when it is desired to discharge materials by gravity. The hooded closure member in this embodiment is moved into position underneath the discharge opening and is only utilized when discharge is to be made by pneumatic means.

BRIEF DESCRIPTION OF THE DRAWINGS

FIG. 1 is a perspective view of a combination pneumatic and gravity gate for regulating discharge of materials from a hopper;
FIG. 2 is a cross-sectional view taken substantially along the line 2—2 of FIG. 1;
FIG. 3 is a cross-sectional view taken along the line 3—3 of FIG. 1;
FIG. 4 is a perspective view showing a modified combination of a gravity and pneumatic gate;
FIG. 5 is a cross-sectional view taken substantially along the line 5—5 of FIG. 4;
FIG. 6 is a cross-sectional view taken substantially along the line 6—6 of FIG. 4; and
FIG. 7 is a cross-sectional view taken substantially along the line 7—7 of FIG. 6.

DESCRIPTION OF THE PREFERRED EMBODIMENT

Referring now particularly to FIGS. 1 through 3, a combination pneumatic and gravity discharge gate is referred to by the reference character 10. The gate 10 is adapted to be attached to a hopper 11 which may contain comminuted material to be discharged. The hopper 11 may be part of a stationary bin or it may be supported on a suitable vehicle such as a railway car or highway trailer. It includes four converging walls 12 suitably connected together and forming at their lower portion a rectangular discharge chamber designated by the letter A. The gate 10 comprises a horizontal frame generally designated at 13 which includes four substantially vertical walls 14 connected in rectangular relation and including at their upper portions outwardly sloping flanges 15 which are suitably connected to the converging walls 12.

As best shown in FIGS. 1 and 3, two of the vertical walls 14 are provided with outwardly extending flange portions 16 which are secured to a flange 21 connected to an upright portion 20 of walls 14. The flange 21 and upright portion 20 as best shown in FIG. 1 extend the length of opposed walls 14. The flanges 16 and 21 are suitably spaced to provide guide slots designated at 19 as shown in FIG. 3. As best shown in FIG. 1, frame guide extensions 17 are suitably connected to the flanges 16 and 21 and include guide slots 18 registering with the slots 19.

A closure member or closure gate is generally designated at 22 and comprises a horizontally extending central portion 23 connected to walls 24 which slope upwardly and include flat horizontal edges 25 which are slidably supported in the slots 18 and 19 for sliding movement. An inverted U-shaped hood 26 is supported on the horizontal central portion 23 and extends substantially the length of the closure member 22. The hood 26 is provided with a plurality of openings 27 which receive material from the sloping walls 24 during pneumatic discharge. As shown in FIG. 3 one of the walls 14 is provided with an opening 28 which is substantially of the same shape as the hood 26 and the wall is so shaped whereby its lower edges are substantially in contiguous relation to the sloping walls 24. As best shown in FIGS. 1 and 2, a rectangular vent duct 29 is connected to the rear portion of the closure member 22 and includes an opening 30 communicating with the interior of the hood 26. The duct 29 includes a top wall 31 which supports a pair of upstanding brackets 32 which rotatably support a shaft 33. The shaft 33 is provided with a pair of pinions 34 which are rotatable therewith. The ends of the duct 29 are closed by means of closure caps 35 which include latching mechanisms that permit the caps 35 to be opened to vent the interior of the hood 26 for pneumatic discharge operation.

Movement of the closure member 22 is effected by rotation of the shaft 33 which rotates the pinions 34 which are in engagement with a pair of racks 36. The racks 36 are interconnected and supported on the hopper 11 by means of a transversely extending flanged member 37. Each rack 36 includes rack teeth 38 engaged by the pinions 34 so that upon rotation of the pinions 34 the closure member 22 may be moved from the position shown in FIGS. 1 and 2 to a position completely removed from the discharge opening A to an out-of-the-way position to one side of the said hopper 11. Rotation of the shaft 33 is effected by the operating heads 39 which provide for manual manipulation upon the insertion of a lever.

A pneumatic conveying means for discharging material from the hopper is generally referred to by the reference character 40. The same includes a duct 41 in communication with a short duct section 42 having an opening 43 which in the open position of the discharge chamber A communicates therewith. In the closed position as shown in FIG. 2, the opening 43 is in direct communication with the open end of the inverted U-shaped hood 26. In the position shown in FIG. 2 an inwardly projecting lip 44 engages the upper edge of the hood 26 so that it effectively provides for through communication of the hood with the pneumatic conveying means 40. The duct 41 is also provided with closure caps 45 which may be removed for connection to a conveying system in conventional manner. The guide extensions 17 and the racks 36 are supported at their ends on a channel shaped end wall member 46, as best shown in FIG. 1.

THE OPERATION

In the position shown in FIG. 1 the gate or closure member 22 is partially moved to a closed position relative to the discharge chamber A. This is effected by rotating the operating heads 39 and shaft 33 in a counter-clockwise rotation until the closure member 22 is in the position shown in FIG. 2 wherein the duct hood 26 is in communication with the pneumatic conveying means 40. One of the caps 45 is now removed and connected to a suitable source of vacuum and conveying means. One of the closure caps 35 is removed to provide a vent so that air may be drawn into the discharge chamber. The suction then provides for the withdrawal of material from the chamber A through the openings 27 and through the duct 41. When the operation is completed and it is desired to remove residue of material from on top of the hood 26, the operating heads are moved in a clockwise rotation withdrawing the closure member 22 to a non-operative position to one side of the discharge chamber A and in so doing the surfaces provided by the opening 28 are effective to scrape material from the top of the hood 26 and it is discharged to the ground. Thus, this serves to clean off the residue on the closure member 22 which is then returned to its closed position so that the hopper may be again filled with material. In order to effectuate gravity discharge from the chamber A the closure member 22 is merely moved to its non-operative position to one side of the chamber A so that material is then discharged by gravity. The sloping surfaces 24 are effective to direct material into the openings 27 to assist in the discharge of material through the hood 26.

THE MODIFICATION

Referring now particularly to FIGS. 4 through 7, a modified combination pneumatic and gravity gate is designated by the reference character 47 and includes a rectangular frame 48 comprising four upright walls 49. Each of the walls 49 includes an upwardly sloping wall portion 50 suitably connected to the walls 12 of a discharge hopper 11. The walls 49 and 12 provide a discharge chamber designated generally by the reference character A. The gate 47 also includes a first closure member 51 of generally the same construction as indicated in the above embodiment. The closure member 51 includes a horizontal flat central portion 52 suitably connected to sloping wall portions 53 having at their upper edges horizontal sliding ledges 54. Two of the opposed walls 49, as best shown in FIG. 5, are provided with offset horizontal flanges 55 on which the horizontal ledges 54 are supported for sliding movement.

Openings 56 provided in an inverted U-shaped hood 57 communicate with the chamber A, the said hood 57 being supported on the flat central portion 52 and extending substantially the full length of the closure member 51. As best shown in FIG. 5, one of the walls 59 is provided with an opening 58 substantially of the same shape as the hood 57 whereupon withdrawal of the closure member 51 from its closed position, as shown in FIG. 6, and the hood 57 moves through the opening 58 to an out-of-the-way position.

As best shown in FIG. 6, wherein the closure member 51 is in a closed position, the hood 57 communicates through an opening 59 provided in one of the walls 49 with a short stub section 60 which is in communication with a duct 61 of the same general construction as the duct 41 described above. Caps 62 suitably close the ends of the ducts 61 and may be removed for connecting the same to a suitable vacuum system for conveying materials to their desired destination. Latching means 63, as shown in FIG. 4, may be readily unlatched in conventional fashion to permit removal of the caps 62. A duct 64 is connected to the other end of the closure member 51 and includes an opening 65 communicating with the hood 57. A pair of brackets 66 laterally spaced are connected to the duct 64 and rotatably support a shaft 67 having connected thereto for rotation therewith a pair of pinions 68. A pair of racks 69 are suitably supported on opposite sides of the upright walls 49, as best shown in FIG. 4. Each rack 69 includes a plurality of rack teeth 70 provided by horizontally spaced apertures. The shaft 67 is also provided with operating heads 71 for rotating the shaft 67 and pinions 68, thereby effecting movement of the closure member 51. A channel-shaped end wall 72, best shown in FIGS. 4 and 6, suitably supports the ends of the racks 69.

A second closure member is designated at 73, and as best shown in FIG. 5, is supported on flanges 74 connected to and disposed above the flanges 55. The flanges 74 are also connected to opposed walls 49, as best shown in FIG. 5. The said flanges 74 support the ends of the closure member 73 for sliding movement. As best shown in FIG. 6, the closure member 73 is provided with an end portion 75 which closes over a ledge 76 on one of the walls 49 to close the discharge chamber A.

The closure member 73 is provided with a pair of horizontally spaced brackets 77 which project upwardly in diagonal fashion and support for rotation thereon a shaft 78 which has connected thereto at opposite ends operating heads 79. The shaft 78 also supports for rotation therewith a pair of spaced pinions 80. A pair of U-shaped racks 81 as best shown in FIGS. 4 and 7 include a plurality of rack teeth 82 formed by horizontally spaced apertures which are engaged by the pinions 80 and during rotation move the closure member 73 to a position from one side of said discharge chamber A to the closed position shown in FIG. 6. Brackets 83 support ends of the racks 81 on an inverted angle, forming one of the sloping wall portions designated at 50, as best shown in FIG. 6. The other ends of the racks 81 are suitably supported on a channel shaped end wall 72.

THE OPERATION

In the operation of the modification, the closure member 51 is placed in the position shown in FIG. 6 to effectuate the discharge of material from the chamber A by a source of vacuum which is suitably connected to the duct 61. For this type of discharge, the operation is the same as above described for the preferred embodiment. During the discharge of the material by means of vacuum the closure member 73 has been withdrawn to an out-of-the way position by means of rotation of the shaft 78 which moves the same to one side of the discharge chamber A where it is supported underneath the racks 81. In the event that discharge is to be effected by gravity solely, the closure member 51 is moved to a position to one side of the discharge chamber where it is supported underneath the rack 69. Upon movement of the closure member 73 to a similar position it can be seen that gravity discharge is then effected. In the event that the hopper 11 is part of a railway hopper car, the combination of the closure members 73 and 51 serve to effectively seal the discharge chamber during train operation and both closure members 73 and 51 are in the position shown in FIG. 6. When the destination has been reached and discharge is to be effected, it is a simple matter to withdraw either of the gates from the discharge opening to effect the type of discharge desired.

Thus, it can be seen that an improved embodiment of a combination pneumatic and gravity gate, and its modification, have been disclosed. It must be understood that changes and further modifications may be made which do not depart from the spirit of the invention as disclosed or from the scope thereof as defined in the appended claims.

What is claimed is:
1. An outlet arrangement for the discharge end of a hopper comprising:
   a frame including vertical walls connected to and being substantially coextensive with said discharge end, said walls providing a chamber to receive and discharge materials from said hopper,
   a closure member movably positioned on said frame for movement between a position closing said chamber and an open position,
   said closure member including sloping sides slidingly supported on opposite verticle walls of said frame,
   pnueumatic inverted generally U-shaped hood means supported on said closure member for movement therewith,
   said hood means being disposed within said chamber during the closed position of said closure member and including openings communicating therewith,
   said sides diverging upwardly from said openings,
   pneumatic conveying means communicating with said hood means only during said closed position and being supported on said frame,
   air intake means communicating with said hood means,
   one of said vertical walls having an opening generally conforming in shape to said hood means, and
   means for moving said closure member from one side of said hopper to a closed position underneath said chamber and said discharge end whereby said hood means moves through said opening in said vertical wall.
2. The invention in accordance with claim 1,
   said vertical wall opposite to said vertical wall having said first opening being provided with a second opening communicating with said pneumatic conveying means and said hood means.
3. The invention in accordance with claim 2,
   said first opening on said vertical wall and said vertical wall having edge portions disposed in substantially contiguous relation to said hood means and said sloping sides whereby during movement of said closure member from underneath said chamber, material to be discharged remaining on said hood means and sloping sides is removed therefrom and discharged by gravity during said movement.
4. The invention in accordance with claim 1,
   including a second closure member slidingly supported on said frame above said first closure member, and being movable from one side of said hopper to a closed position relative to said discharge end, and second means on said frame for moving said second closure member.
5. The invention in accordance with claim 4,
   said first and second means for moving said closure member comprising,
   first rack means supported on said frame and extending laterally horizontally with respect thereto,
   first pinion means supported on said first closure member and engaging said first rack means,
   second rack means supported on said frame above said first rack means and extending substantially coextensive with respect thereto, and
   second pinion means on said second closure member and engaging said second rack means.

References Cited

UNITED STATES PATENTS

| | | | |
|---|---|---|---|
| 2,393,932 | 1/1946 | Petroe | 302—52 |
| 2,926,963 | 3/1960 | Dorex | 302—52 |
| 3,316,030 | 4/1967 | Kemp | 302—52 |
| 3,360,302 | 12/1967 | Bagguley | 302—53 |
| 3,373,884 | 3/1968 | Dorex | 302—52 |

ANDRES H. NIELSEN, *Primary Examiner.*